United States Patent
Takeda et al.

(10) Patent No.: US 10,425,925 B2
(45) Date of Patent: Sep. 24, 2019

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Tooru Uchino, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 20 days.

(21) Appl. No.: 15/563,701

(22) PCT Filed: Mar. 31, 2016

(86) PCT No.: PCT/JP2016/060648
§ 371 (c)(1),
(2) Date: Oct. 2, 2017

(87) PCT Pub. No.: WO2016/159229
PCT Pub. Date: Oct. 6, 2016

(65) Prior Publication Data
US 2018/0070352 A1  Mar. 8, 2018

(30) Foreign Application Priority Data

Apr. 2, 2015 (JP) .................................. 2015-076142

(51) Int. Cl.
*H04W 72/04* (2009.01)
*H04L 5/00* (2006.01)
(Continued)

(52) U.S. Cl.
CPC ....... *H04W 72/0413* (2013.01); *H04L 1/1671* (2013.01); *H04L 1/1812* (2013.01);
(Continued)

(58) Field of Classification Search
CPC ...... H04L 5/001; H04L 5/0055; H04W 24/10; H04W 72/04; H04W 72/0413; H04W 72/0446; H04W 88/02; H04W 88/08
See application file for complete search history.

(56) References Cited

U.S. PATENT DOCUMENTS 10,085,165 B2 * 9/2018 Dinan .................. H04L 5/0057
2013/0077514 A1 * 3/2013 Dinan .................. H04L 5/0057
370/252

(Continued)

OTHER PUBLICATIONS

International Search Report issued in PCT/JP2016/060648 dated Jun. 21, 2016 (1 page).

(Continued)

*Primary Examiner* — Khaled M Kassim
(74) *Attorney, Agent, or Firm* — Osha Liang LLP

(57) ABSTRACT

The present invention is designed so that UL transmission can be made adequately even when transmission of uplink control information using secondary cells (SCells) is made configurable. A user terminal communicates with a radio base station by using carrier aggregation, and has a generating section that generates uplink control information based on a DL signal transmitted from the radio base station, and a control section that controls transmission of the uplink control information, and the control section controls the transmission of the uplink control information by applying simultaneous transmission of an uplink control channel and an uplink shared channel to each of a plurality of cell groups, each including at least one component carrier (CC).

4 Claims, 13 Drawing Sheets

(51) Int. Cl.
  *H04W 24/10* (2009.01)
  *H04L 1/18* (2006.01)
  *H04L 1/16* (2006.01)
  *H04W 88/02* (2009.01)
  *H04W 88/08* (2009.01)

(52) U.S. Cl.
  CPC ............ *H04L 5/001* (2013.01); *H04L 5/0044* (2013.01); *H04L 5/0053* (2013.01); *H04L 5/0055* (2013.01); *H04W 24/10* (2013.01); *H04W 72/0446* (2013.01); *H04W 88/02* (2013.01); *H04W 88/08* (2013.01)

(56) References Cited

U.S. PATENT DOCUMENTS

| | | | | |
|---|---|---|---|---|
| 2014/0169321 A1* | 6/2014 | Imamura | ............ | H04W 52/146 370/329 |
| 2014/0226551 A1* | 8/2014 | Ouchi | ............ | H04W 52/04 370/311 |
| 2015/0098441 A1* | 4/2015 | Peng | ............ | H04W 72/042 370/330 |
| 2015/0223234 A1* | 8/2015 | Seo | ............ | H04W 52/146 370/329 |
| 2016/0157223 A1* | 6/2016 | Nogami | ............ | H04W 16/32 370/329 |
| 2016/0278083 A1* | 9/2016 | Dinan | ............ | H04B 7/0626 |
| 2017/0208581 A1* | 7/2017 | Yang | ............ | H04W 72/14 |
| 2017/0280441 A1* | 9/2017 | Shimezawa | ............ | H04W 52/44 |
| 2017/0374661 A1* | 12/2017 | Aiba | ............ | H04W 8/22 |
| 2018/0020429 A1* | 1/2018 | Aiba | ............ | H04J 1/00 |
| 2018/0020430 A1* | 1/2018 | Aiba | ............ | H04W 24/10 |
| 2018/0167129 A1* | 6/2018 | Aiba | ............ | H04B 7/08 |
| 2018/0262377 A1* | 9/2018 | Liu | ............ | H04L 1/0026 |

OTHER PUBLICATIONS

Written Opinion of the International Searching Authority issued in PCT/JP2016/060648 dated Jun. 21, 2016 (3 pages).
Ericsson; "PUCCH on SCell for carrier aggregation"; 3GPP TSG-RAN WG1#80, R1-150321; Athens, Greece; Feb. 9-13, 2015 (3 pages).
CATT; "PUCCH on SCell for Rel-13 CA"; 3GPP TSG RAN WG1 Meeting #80, R1-150101; Athens, Greece; Feb. 13, 2015 (3 pages).
Intel Corporation; "Support of PUCCH on SCell for CA"; 3GPP TSG-RAN WG1 #80, R1-150085; Athens, Greece; Feb. 9-13, 2015 (6 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Extended European Search Report issued in the counterpart European Patent Application No. 16773109.0, dated Oct. 10, 2018 (10 pages).

* cited by examiner

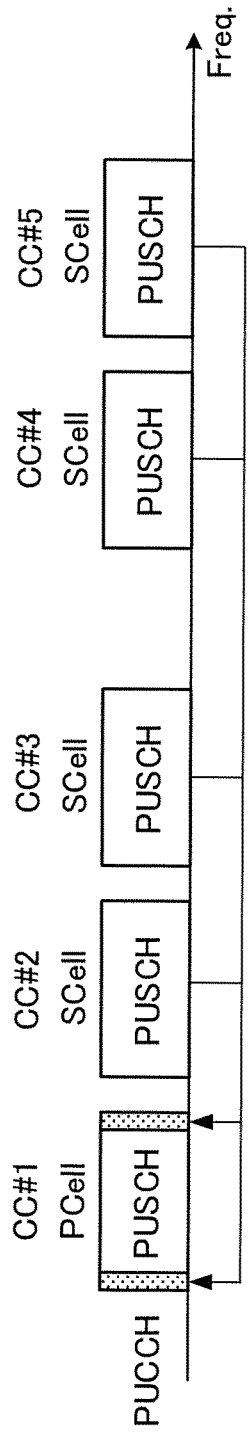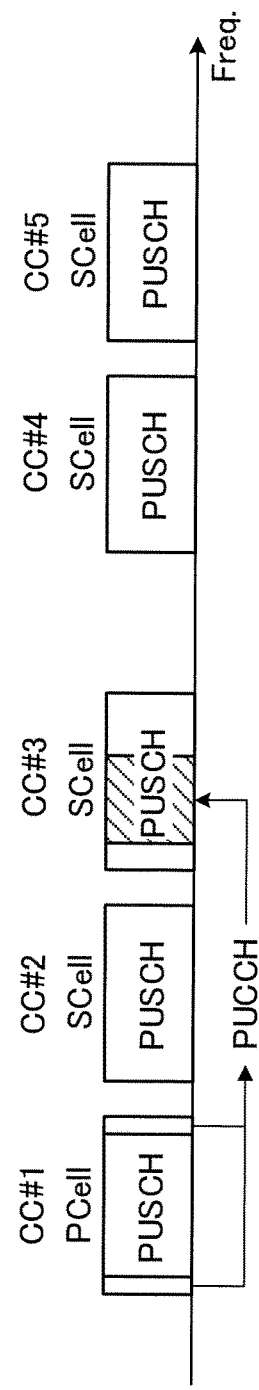
FIG. 1A
FIG. 1B

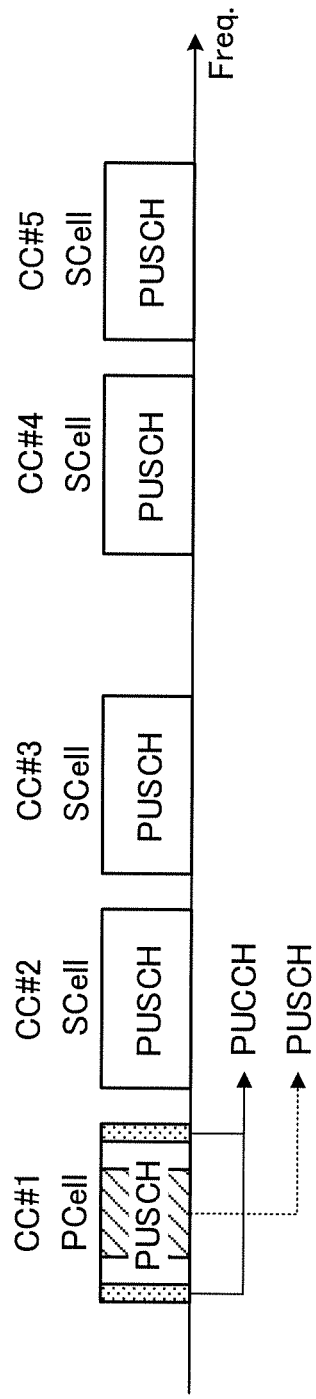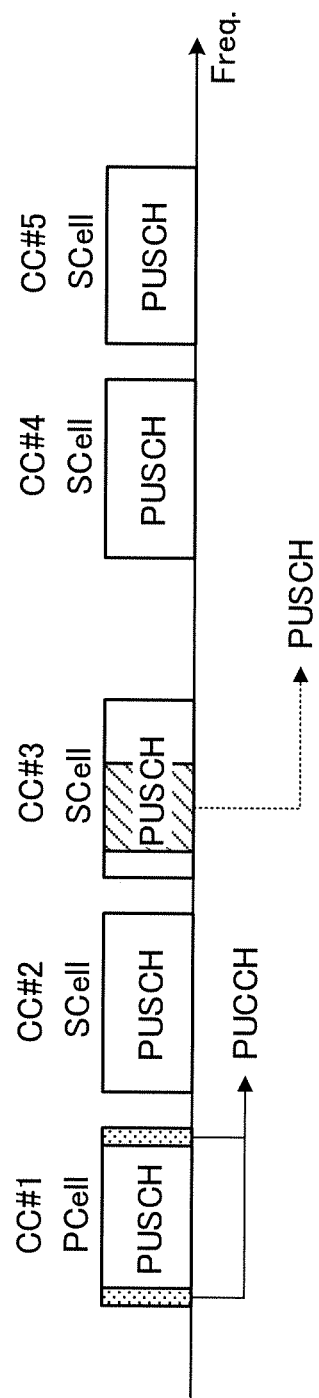
FIG. 2A
FIG. 2B

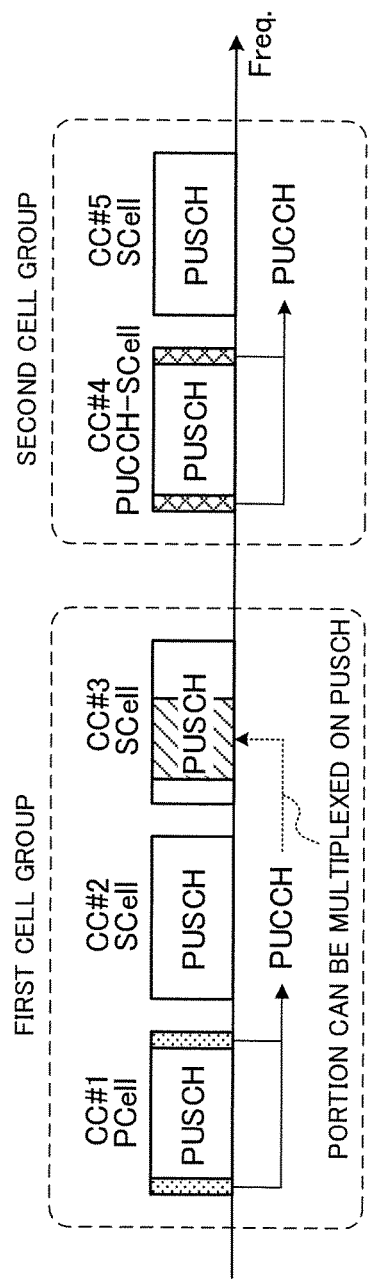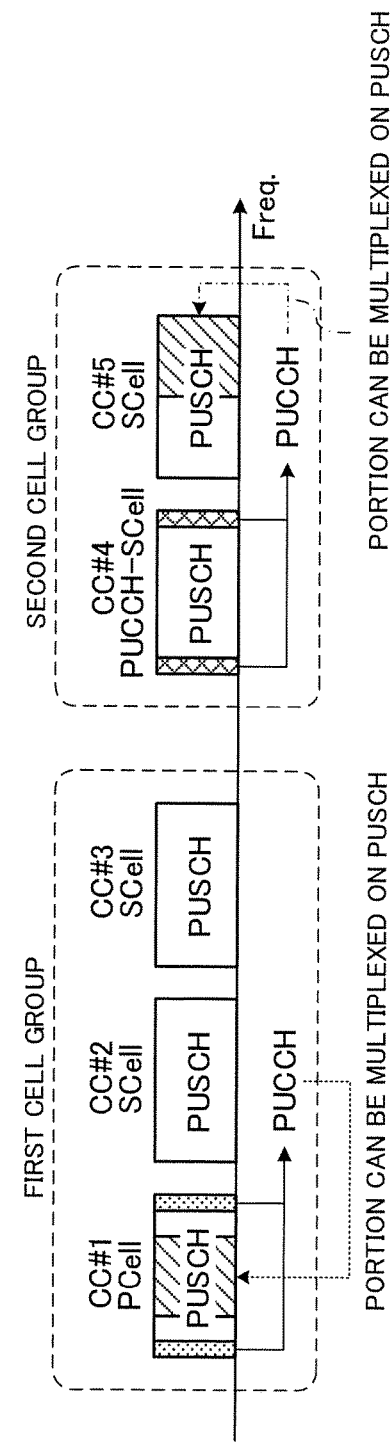
FIG. 4A
FIG. 4B

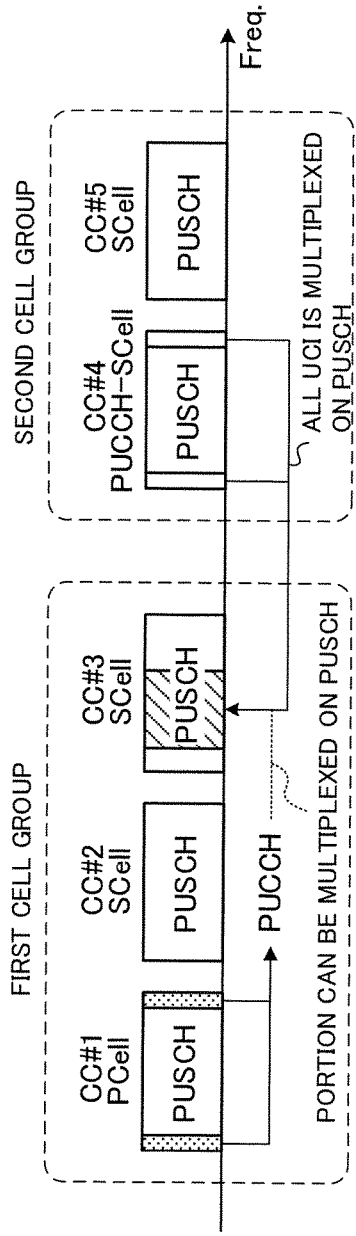
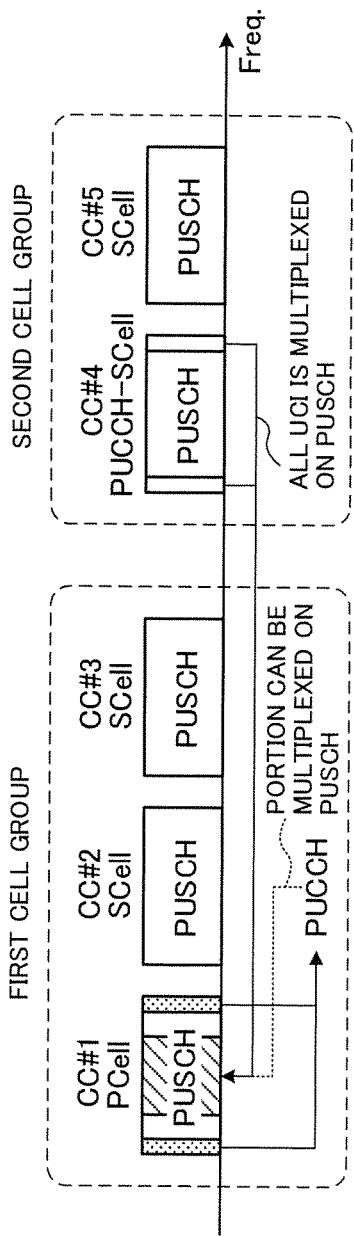
FIG. 5A
FIG. 5B

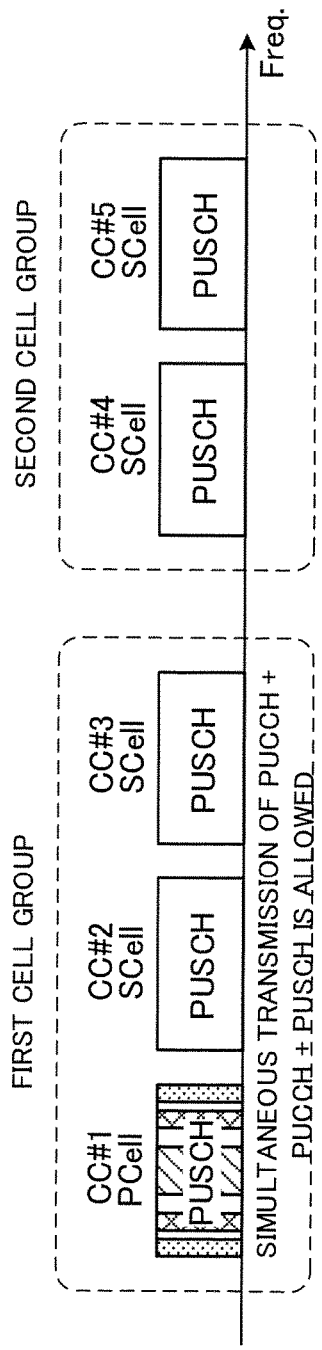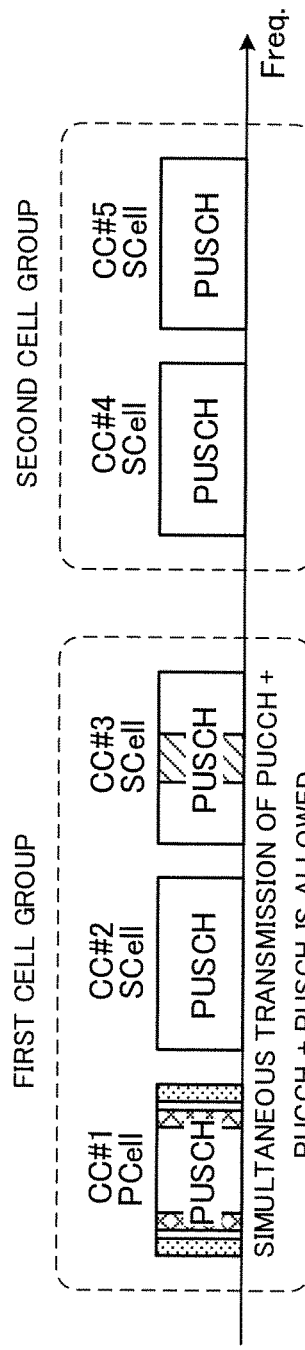
FIG. 7A
FIG. 7B

USER TERMINAL, RADIO BASE STATION AND RADIO COMMUNICATION METHOD

TECHNICAL FIELD

The present invention relates to a user terminal, a radio base station and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). Successor system of LTE—referred to as "LTE-advanced" (also referred to as "LTE-A")—have been under study for the purpose of achieving further broadbandization and increased speed beyond LTE, and the specifications thereof have been drafted as LTE Rel. 10 to 12.

The system band in LTE Rel. 10 to 12 includes at least one component carrier (CC), where the LTE system band constitutes one unit. Such bundling of a plurality of CCs into a wide band is referred to as "carrier aggregation" (CA).

In CA of Rel. 10 to 12, uplink control information (UCI) to be transmitted from a user terminal is transmitted in an uplink control channel (PUCCH). Also, when the PUCCH and the PUSCH have to be transmitted at the same time while simultaneous transmission of an uplink control channel and an uplink shared channel (PUSCH) is not configured, the user terminal multiplexes all the uplink control information on the PUSCH (piggyback).

CITATION LIST

Non-Patent Literature

Non-Patent Literature 1: 3GPP TS 36. 300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In CA of and after LTE Rel. 13, which is a more advanced successor system of LTE, a method ("PUCCH on SCell") of transmitting uplink control information by using the PUCCHs not only of the primary cell, but also of secondary cells (SCells), in order to realize more flexible wireless communication, is under study.

However, when a user terminal transmits uplink control information by using the PUCCHs of secondary cells, if uplink data transmission (PUSCH transmission) is commanded in a certain CC, how to transmit the uplink control information and the uplink data becomes the problem.

The present invention has been made in view of the foregoing points, and it is therefore an object of the present invention to provide a user terminal, a radio base station and a radio communication method that allow adequate UL transmission even when transmission of uplink control information using secondary cells (SCells) is made configurable.

Solution to Problem

According to the present invention, a user terminal communicates with a radio base station by using carrier aggregation, and has a generating section that generates uplink control information based on a DL signal transmitted from the radio base station, and a control section that controls transmission of the uplink control information, and the control section controls the transmission of the uplink control information by applying simultaneous transmission of an uplink control channel and an uplink shared channel to each of a plurality of cell groups, each including at least one component carrier (CC).

Advantageous Effects of Invention

According to the present invention, UL transmission can be made adequately even when transmission of uplink control information using secondary cells (SCells) is made configurable.

BRIEF DESCRIPTION OF DRAWINGS

FIG. 1 provide diagrams to show examples of uplink control information allocation methods according to Rel. 12 and earlier versions;

FIG. 2 provide diagrams to show examples of simultaneous PUCCH-PUSCH transmission;

FIG. 4 provide diagrams to show examples of the uplink control information transmission method according to a first example;

FIG. 5 provide diagrams to show examples of the uplink control information transmission method according to a second example;

FIG. 7 provide diagrams to show other examples of the uplink control information transmission method according to the third example;

DESCRIPTION OF EMBODIMENTS

Figure 3:
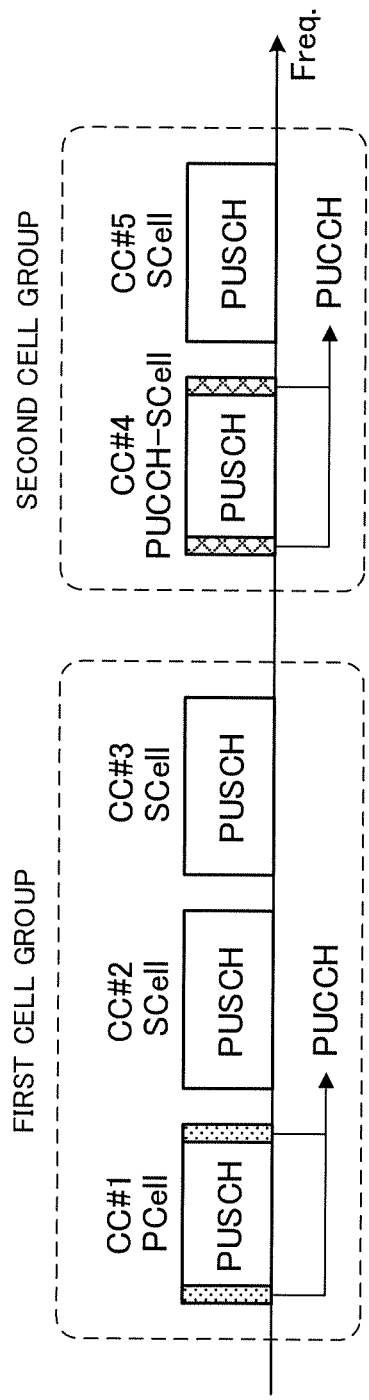
FIG. 3 is a diagram to show an example of the case of controlling PUCCH transmission per cell group.

FIG. 1 provide diagrams to show examples of uplink control information (UCI) transmission methods according to Rel. 10 to 12. FIG. 1A shows a UCI multiplexing method that is for use when there is no uplink data transmission command (PUSCH transmission), and FIG. 1B shows a UCI multiplexing method that is for use when there is an uplink data transmission command. Also, in FIG. 1 illustrate examples of cases where five CCs (one PCell and four SCells) are configured, and where simultaneous transmission of a PUCCH and a PUSCH is not configured.

FIG. 1A shows a case where, in a given subframe, PUSCH transmission is not carried out in CC #1 to CC #5.

In this case, a user terminal multiplexes and transmits each CC's uplink control information on the PUCCH of a predetermined CC (here, CC #1).

FIG. 1B shows a case where there is uplink data (PUSCH transmission) to transmit to a radio base station in CC #3 (SCell) of a given subframe. In this case, a user terminal multiplexes (piggyback) and transmits uplink control information (the uplink control information that should be transmitted in the PUCCH of CC #1) on the PUSCH of CC #3.

In this way, when simultaneous transmission of a PUCCH and a PUSCH is not configured, given that a user terminal does not transmit a PUCCH when there is a PUSCH to transmit, it is possible to maintain single carrier transmission. Note that a structure may be employed here in which, when PUSCH transmission takes place in multiple CCs, a PUCCH is allocated to a predetermined CC (the primary cell, the secondary cell with the minimum cell index, etc.).

Also, in CA of Rel. 10 to 12, simultaneous transmission of a PUCCH and a PUSCH (simultaneous PUCCH-PUSCH transmission) is supported. FIG. 2 show examples of uplink control information transmission methods for use when simultaneous PUCCH-PUSCH transmission is configured.

When simultaneous PUCCH-PUSCH transmission is configured, uplink control information is transmitted by using PUCCHs alone, or by using some PUCCHs and some PUSCHs. Simultaneous PUCCH-PUSCH transmission has two patterns—namely, simultaneous PUCCH-PUSCH transmission within a CC and simultaneous PUCCH-PUSCH transmission across CCs.

FIG. 2A shows a case where, when simultaneous PUCCH-PUSCH transmission within a CC is configured, a user terminal simultaneously allocates (multiplexes) a PUCCH and a PUSCH to one CC (here, the primary cell). When PUSCH transmission does not take place in a given subframe, a user terminal transmits uplink control information using the PUCCH. On the other hand, when PUSCH transmission takes place in a given subframe in a predetermined CC, the user terminal transmits the PUCCH and the PUSCH.

When the uplink control information to transmit is one of a delivery acknowledgement signal (HARQ-ACK)/scheduling request (SR) and periodic channel state information (P-CSI), the user terminal transmit the uplink control information using the PUCCH. On the other hand, if the uplink control information to transmit includes an HARQ-ACK/SR and P-CSI, the user terminal transmits the HARQ-ACK/SR in the PUCCH, and transmits the P-CSI in the PUSCH (UCI on PUSCH).

FIG. 2B shows a case where, when simultaneous PUCCH-PUSCH transmission across CCs is configured, a user terminal simultaneously allocates a PUCCH and a PUSCH to different CCs. Here, a case is shown where the PUCCH is allocated to the primary cell (CC #1) and the PUSCH is allocated to a secondary cell (CC #3). When, in a given subframe, PUSCH transmission does not take place in any CC, the user terminal transmits uplink control information using the PUCCH. On the other hand, when PUSCH transmission takes place in a CC in a given subframe, the user terminal transmits the PUCCH and the PUSCH.

When the uplink control information to transmit is one of an HARQ-ACK/SR and P-CSI, the user terminal transmits the uplink control information using the PUCCH. On the other hand, if the uplink control information to transmit includes an HARQ-ACK/SR and P-CSI, the user terminal transmits the HARQ-ACK/SR in the PUCCH, and transmits the P-CSI in the PUSCH (UCI on PUSCH).

Also, with CA of Rel. 13 and later versions, a study is in progress to transmit uplink control information by using not only the PUCCH of the PCell, but also by using the PUCCHs of SCells (PUCCH on SCell). In particular, in Rel. 13 and later versions, a study is in progress to apply CA, in which the number of CCs, which has been limited to five CCs or fewer until Rel. 12, is expanded. When CA is executed with an expanded number of CCs, it is possible to prevent the concentration of uplink control information in the PCell by applying PUCCH on SCell.

To transmit uplink control information by using SCells' PUCCHs, it may be possible to configure a plurality of cell groups, which are each comprised of at least one CC, and determine the HARQ transmission timing and/or PUCCH resources on a per cell group basis. A cell group like this may be referred to as a "PUCCH cell group," a "PUCCH CG," or a "PUCCH cell-group." Also, an SCell in which a PUCCH is configured in a cell groups may be referred to as a "PUCCH cell," a "PUCCH CC," or a "PUCCH-SCell."

FIG. 3 shows a case where two cell groups are configured in CA in which five CCs are configured. FIG. 3 shows the case where the first cell group is comprised of CC #1 to CC #3 and the second cell group is comprised CC #4 and CC #5, and where CC #1 is the PCell and CCs #2 to #5 are SCells.

A user terminal can transmit uplink control information using the PUCCH configured in one CC in each cell group. FIG. 3 presumes the case where the first cell group transmits a PUCCH in CC #1, which serves as the primary cell, and where the second cell group transmits a PUCCH in CC #4, which serves that serves as a PUCCH-SCell. Thus, by controlling the transmission of uplink control information by configuring the allocation of PUCCHs every predetermined cell group, it is possible to transmit uplink control information properly even when the number of CCs is expanded.

On the other hand, when PUCCH transmission (PUCCH on SCell) is controlled per cell group, how to transmit uplink control information and uplink data when a PUSCH (PUSCH transmission) is allocated is a problem. Further, when PUCCH transmission (PUCCH on SCell) is controlled on a per cell group basis, how to transmit uplink control information and uplink data when simultaneous PUCCH-PUSCH transmission is configured is a problem.

So, assuming the case where PUCCH transmission (PUCCH on SCell) is controlled by configuring cell groups, the present inventors have come up with the idea of controlling the transmission of uplink control information (UCI on PUSCH) by configuring simultaneous PUCCH-PUSCH transmission per cell group or between cell groups.

Now, the present embodiment will be described in detail below with reference to the accompanying drawings. Note that, although cases will be shown in the following description in which the number of CCs is five, the present embodiment is by no means limited to this. The present embodiment is applicable to cases where the number of CCs is four or less or to cases where the number of CCs is six or more. Although, examples will be shown in the following description where two cell groups of the first cell group and the second cell group will be used as a plurality of cell groups, the number of cell groups is not limited to this.

First Example

A case will be described with the first example where, when PUCCH on SCell is used, simultaneous PUCCH-PUSCH transmission is configured per cell group (within a CG), and UCI on PUSCH across cell groups is not employed. In simultaneous PUCCH-PUSCH transmission to apply to each cell group, simultaneous PUCCH-PUSCH transmission can be applied within a CC or across CCs. In addition, when there are different cell groups, simultaneous PUCCH-PUSCH transmission within a CC and simultaneous PUCCH-PUSCH transmission across CCs can be applied individually. Further, the control method stipulated in in Rel. 12 can be applied to UL transmission in the CCs of each cell group when simultaneous PUCCH-PUSCH is employed.

FIG. 4A shows an example of a case where transmission of PUCCHs and PUSCHs is controlled by configuring simultaneous PUCCH-PUSCH transmission (across CCs) on a per cell group basis. FIG. 4 shows a case where a first cell group with three CCs and a second cell group with two CCs are configured in a user terminal. Information about the CCs and/or cell groups to configure in the user terminal can be reported to the user terminal through higher layer signaling (for example, RRC signaling and so on).

Further, FIG. 4A shows a case where a PUCCH is transmitted by using CC #1, which serves as the PCell in the first cell group, and where a PUCCH is transmitted by using CC #4, which serves as a PUCCH-SCell in the second cell group.

For example, assume the case where, in a given subframe, a PUSCH is transmitted in CC #3 (SCell) of the first cell group and where no PUSCH is transmitted in the second cell group. In this case, in the first cell group, uplink control information (for example, an HARQ-ACK/SR or P-CSI) of the CCs of the first cell group is transmitted in the PUCCH of CC #1, and uplink data is transmitted in the PUSCH of CC #3. In the second cell group, uplink control information of the CCs of the second cell group is transmitted by using the PUCCH of CC #4.

Also, when there are an HARQ-ACK/SR and P-CSI as uplink control information of the CCs of the first cell group, it is possible to allocate the HARQ-ACK/SR to the PUCCH of CC #1 and allocate the P-CSI to the PUSCH of CC #3 and transmit these. In the case illustrated in FIG. 4A, simultaneous PUCCH-PUSCH transmission might occur in each cell group, independently, so that uplink control information may be distributed into maximum four channels (CHs).

FIG. 4B shows an example of a case where the transmission of PUCCHs and PUSCHs is controlled by configuring simultaneous PUCCH-PUSCH transmission within a CC in the first cell group and configuring simultaneous PUCCH-PUSCH transmission across CCs in the second cell group.

For example, assume the case where, in a given subframe, a PUSCH is transmitted in CC #1 (PCell) in the first cell group and a PUSCH is transmitted in CC #5 in the second cell group. In this case, the first cell group transmits at least uplink control information (for example, an HARQ-ACK/SR or P-CSI) of the CCs of the first cell group in the PUCCH of CC #1, and, furthermore, transmits uplink data in the PUSCH of CC #1. Also, when there are an HARQ-ACK/SR and P-CSI as uplink control information of the CCs of the first cell group, it is possible to allocate the HARQ-ACK/SR to the PUCCH of CC #1 and allocate the P-CSI to the PUSCH of CC #1 and transmit these.

In the second cell group, at least uplink control information (for example, an HARQ-ACK/SR or P-CSI) of the CCs of the second cell group is transmitted in the PUCCH of CC#4, and uplink data is transmitted in the PUSCH of C #5. When there are an HARQ-ACK/SR and P-CSI as uplink control information of the CCs of the second cell group, it is possible to allocate the HARQ-ACK/SR to the PUCCH of CC #4 and allocate the P-CSI to the PUSCH of CC #5 and transmit these.

The required communication quality differs between a cell group including a PCell that secures connectivity through mobility management and communication quality measurements and a cell group not including a PCell. Cell groups not including a PCell are highly likely to be additionally used to improve throughput, and yet securing the quality of UCI is not necessarily guaranteed. However, in the first example, it is possible to control the transmission of uplink control information and uplink data by configuring simultaneous PUCCH-PUSCH transmission on a per cell group basis, so that it is possible to configure simultaneous PUCCH-PUSCH transmission in the second cell group without affecting the UCI quality of the first cell group.

Further, the user terminal may transmit periodic channel state information (P-CSI) on a per cell group basis. In existing CA, only one CC's P-CSI can be reported per subframe, and other CCs' CSIs are not allowed to be reported at the same time (that is, dropped). By contrast, with the first example, it is possible to configure P-CSI reports of varying cell groups in the same period and in the same timing. This enables highly accurate scheduling in the radio base station based on the P-CSI of each cell group.

In the first embodiment, it is also possible to use the UL transmission control in dual connectivity (DC) in Rel. 12.

Second Example

A case will be described below with a second example where, when PUCCH on SCell is used, simultaneous PUCCH-PUSCH transmission is configured across cell groups (across CGs), and UCI on PUSCH is applied across cell groups. As for the simultaneous PUCCH-PUSCH transmission to apply, simultaneous PUCCH-PUSCH transmission within a CC or across CCs can be applied. In the second example, after the cell groups are configured, it is possible to apply the simultaneous PUCCH-PUSCH transmission supported in Rel. 12 or earlier versions.

In the second embodiment, when there is PUSCH transmission in a given CC, control is exerted so that uplink control information (UCI) is distributed only up to a predetermined number of channels (PUCCH, PUSCH, etc.). For example, when two cell groups are configured, a user terminal exerts control so that uplink control information is distributed only up to two channels (one PUCCH and one PUSCH). In this case, it is allowed to multiplex uplink control information (UCI) of a given cell group on the PUSCH of another cell group.

Note that the number of channels to which the uplink control information is allocated is not limited to the number of cell groups configured, and may be a fixed value (for example, 2) or may be changed based on the number of cell groups. Furthermore, the channels here correspond to the channels of each CC (PUCCH and PUSCH).

FIG. 5A shows an example of a case where transmission of PUCCHs and PUSCHs is controlled by configuring simultaneous PUCCH-PUSCH transmission in CCs across different cell groups (across CCs). FIG. 5A shows a case where a first cell group with three CCs and a second cell group with two CCs are configured in a user terminal.

Further, FIG. 5A shows a case where a PUCCH is configured in CC #1, which serves as the PCell in the first cell group, and where a PUCCH is configured in CC #4, which serves as a PUCCH-SCell in the second cell group. In this case, if there is no PUSCH transmission in any of the CCs, the user terminal can transmit uplink control information of the first cell group by using the PUCCH of CC #1, and transmit uplink control information of the second cell group by using the PUCCH of CC #4.

On the other hand, assume the case where, in a given subframe, a PUSCH is transmitted in CC #3 (SCell) of the first cell group and a PUSCH is not transmitted in the second cell group. In this case, in the first cell group, uplink control information (for example, an HARQ-ACK/SR, or P-CSI) of the CCs of the first cell group is transmitted in the PUCCH of CC #1, and uplink data is transmitted in the PUSCH of CC #3. In the second cell group, the control information to be transmitted in the PUCCH of CC #4 if there is no PUSCH transmission is multiplexed and transmitted on the PUSCH of CC #3 of the first cell group.

Also, when there are an HARQ-ACK/SR and P-CSI as uplink control information of the first cell group, it is possible to allocate the HARQ-ACK/SR to the PUCCH of CC #1 and allocate the P-CSI to the PUSCH of CC #3 and transmit these.

In this way, in FIG. 5A, it is allowed to multiplex the uplink control information of each cell group on the PUSCHs of different cell groups. Also, when a PUSCH is transmitted in any of the CCs, the user terminal executes control so that uplink control information is distributed into two or fewer channels (here, one PUCCH and one PUSCH) but is not distributed into three or more channels. That is, when there is PUSCH transmission in one of the CCs, the user terminal executes control to break uplink control information into two channels at a maximum.

Further, in FIG. 5A, control is executed so that, when a PUSCH is transmitted in a given CC (here, a cell in the first cell group), all the uplink control information of the other cell group (here, the second cell group) is multiplexed on this PUSCH. In other words, control is executed so that no PUCCH is transmitted in the other cell group. Simultaneous PUCCH-PUSCH transmission can be configured on a per user terminal basis, without distinction between cell groups.

Also, when a PUSCH is transmitted in a given CC, the user terminal can transmit part or all of the uplink control information of the cell group including a PCell in the PUCCH of the PCell, and transmit all the uplink control information of the other cell group in the PUSCH.

For example, when there are an HARQ-ACK/SR and P-CSI as uplink control information of the first cell group, it is possible to allocate the HARQ-ACK/SR to the PUCCH of CC #1 and allocate the P-CSI to the PUSCH of CC #3 and transmit these. Also, when there are an HARQ-ACK/SR and P-CSI as uplink control information of the first cell group, it is possible to allocate the HARQ-ACK/SR and the P-CSI to the PUCCH of CC #1 and transmit these.

As for the uplink control signals of the second cell group not including a PCell, an HARQ-ACK/SR and P-CSI can be transmitted using the PUSCH of a CC where PUSCH transmission is commanded (CC #3 in this case).

When uplink control information that is generated cannot be accommodated in two or fewer channels (here, one PUCCH and one PUSCH), it is possible to drop (skip) information of low priority according to predetermined rules (for example, based on priorities of UCI types where SRs and HARQ-ACKs are prioritized over CQI, priorities of CC indices where smaller CC indices are prioritized, and so on).

By this means, when there is PUSCH transmission, the user terminal can transmit uplink control information in one PUCCH and one PUSCH. Accordingly, when transmitting uplink control information using a PUSCH, the user terminal does not have to perform the transmission using each cell group's PUCCH. By this means, it is possible to prevent uplink control information from breaking into three or more channels, so that it is possible to improve the received quality of UL signals.

FIG. 5B shows an example of a case where the transmission of PUCCHs and PUSCHs is controlled by configuring simultaneous PUCCH-PUSCH transmission (within a CC) in CCs between different cell groups. FIG. 5B shows a case where a first cell group with three CCs and a second cell group with two CCs are configured in a user terminal.

For example, assume the case where, in a given subframe, a PUSCH is transmitted in CC #1 (PCell) of the first cell group and a PUSCH is not transmitted in the second cell group. In this case, in the first cell group, uplink control information (for example, an HARQ-ACK/SR or P-CSI) of the CCs of the first cell group is transmitted in the PUCCH of CC #1, and uplink data is transmitted in the PUSCH of CC #1. In the second cell group, the control information to be transmitted in the PUCCH of CC #4 if there is no PUSCH transmission is multiplexed and transmitted on the PUSCH of CC #1 of the first cell group.

Also, when there are an HARQ-ACK/SR and P-CSI as uplink control information of the first cell group, it is possible to allocate the HARQ-ACK/SR to the PUCCH of CC #1 and allocate the P-CSI to the PUSCH of CC #1 and transmit these.

By this means, when there is PUSCH transmission, the user terminal can transmit uplink control information in one PUCCH and one PUSCH. Consequently, when transmitting uplink control information using a PUSCH, the user terminal does not have to perform the transmission using each cell group's PUCCH. By this means, it is possible to prevent uplink control information from breaking into three or more channels, so that it is possible to improve the received quality of UL signals.

Third Example

A case will be described with a third example where the PUCCH of a given cell group is configured in another cell group.

Figure 6:
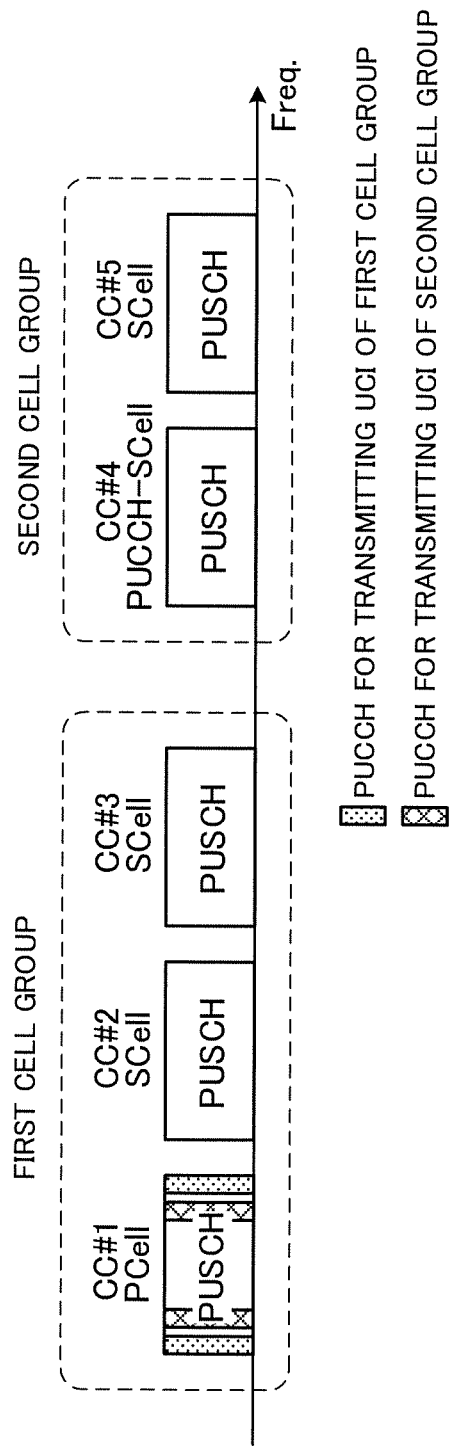
FIG. 6 is a diagram to show an example of the uplink control information transmission method according to a third example.

For example, it is possible to configure a PUCCH for a cell group (the second cell group in FIG. 3) that does not include a PCell, among a plurality of cell groups, in a PCell (the first cell group in FIG. 3) (see FIG. 6). In this case, the user terminal transmits uplink control information by configuring a PUCCH for the first cell group and a PUCCH for the second cell group in the PCell (CC #1) of the first group. In other words, the uplink control information of each cell group is transmitted in different PUCCHs of the same CC (here, the PCell).

Note that FIG. 6 shows a case where PUSCH transmission is not commanded in any of the CCs. If PUSCH transmission is commanded in any of the CCs, it is possible to use the transmission method described in the first or the second example.

FIG. 7 shows a case where, in accordance with the first embodiment in which simultaneous PUCCH-PUSCH transmission is controlled on a per cell group basis, the PUCCH for a cell group that does not include a PCell (here, the second cell group) is configured in a PCell.

FIG. 7A assumes the case where simultaneous PUCCH-PUSCH transmission (within a CC) is configured in the first cell group, and where PUSCH transmission is carried out in the PCell (CC #1). In this case, the user terminal transmits uplink control information by configuring the PUCCH for the first cell group and the PUCCH for the second cell group in the PCell (CC #1). Further, the user terminal transmits uplink data by using the PUSCH of the PCell.

In this case, in CC #1, the user terminal allows simultaneous transmission of the PUCCH for the first cell group, the PUCCH for the second cell group and a PUSCH. Note that, if each cell group's uplink control information includes an HARQ-ACK/RS and P-CSI, the user terminal can allocate a portion of the uplink control information (for example, the P-CSI) to the PUSCH of CC #1.

FIG. 7B shows a case where simultaneous PUCCH-PUSCH transmission (across CCs) is configured in the first cell group, and where PUSCH transmission is carried out in CC #3 of the first cell group. In this case, the user terminal transmits uplink control information by configuring the PUCCH for the first cell group and the PUCCH for the second cell group in the PCell (CC #1). Further, the user terminal transmits the uplink data using the PUSCH of CC #3. Note that, if each cell group's uplink control information includes an HARQ-ACK/RS and P-CSI, the user terminal can allocate a portion of the uplink control information (for example, the P-CSI) to the PUSCH of CC #3.

In this way, by allocating the PUCCH for the second cell group to a predetermined CC (for example, the PCell) of the first cell group and configuring simultaneous PUCCH-PUSCH transmission for each cell group, it is possible to gather the most important UCI (for example, HARQ-ACKs, SRs, etc.) in the predetermined CC (for example, the PCell) where quality assurance is required, and, meanwhile, offload other less important pieces of UCI (for example, CQI) to SCells and to the PUSCH of the PCell. By setting different PUCCHs per cell group, different quality control can be applied on a cell group basis—for example, it is possible to configure a PUCCH format, in which the payload is small and which allows easy quality assurance, for the first cell group including a PCell, and configure, for the second cell group added for throughput improvement, a PUCCH format, in which the payload is large and which enables fine HARQ control for a large number of CCs.

FIG. 8 shows a case where, in accordance with the second embodiment in which simultaneous PUCCH-PUSCH transmission is controlled across cell groups, the PUCCH for a cell group that does not include a PCell (here, the second cell group) is configured in a PCell.

Figure 8A:
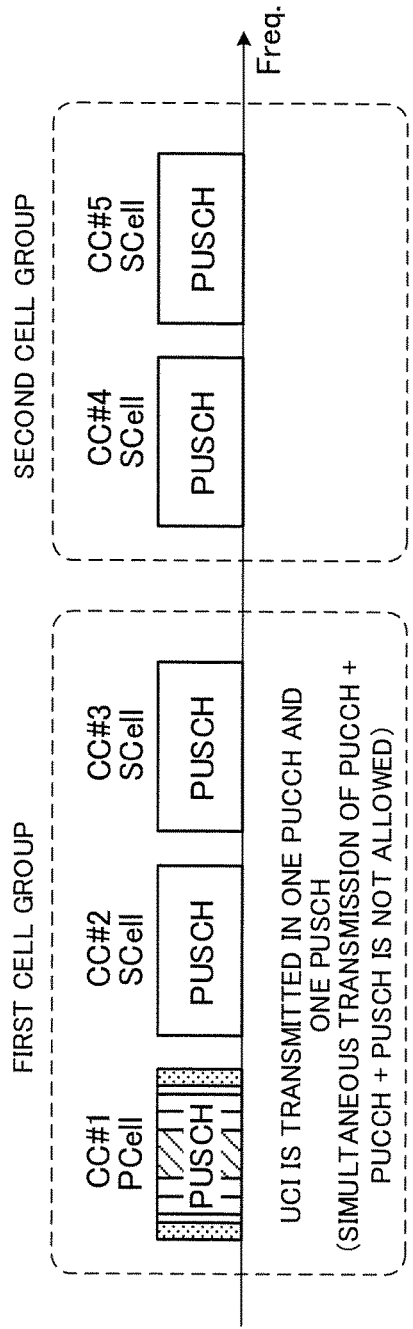
FIG. 8 provide diagrams to show examples of the uplink control information transmission methods according to the third example.

FIG. 8A assumes a case where simultaneous PUCCH-PUSCH transmission (within a CC) is configured in the first cell group, and where the number of channels into which the uplink control information of each cell group can be distributed is limited (for example, two or less). For example, if PUSCH transmission is performed in a PCell (CC #1), the user terminal transmits uplink control information by configuring the PUCCH for the first cell group in the PCell (CC #1). Meanwhile, the uplink control information for the second cell group is transmitted by using the PUSCH configured in the PCell (CC #1).

In this case, in CC #1, the user terminal does not allow simultaneous transmission of the PUCCH for the first cell group, the PUCCH for the second cell group and a PUSCH, and, instead, controls the transmission of uplink control information by using one PUCCH and one PUSCH. Note that, if each cell group's uplink control information includes an HARQ-ACK/RS and P-CSI, the user terminal can allocate a portion of the uplink control information (for example, the P-CSI) to the PUSCH of CC #1.

Figure 8B:
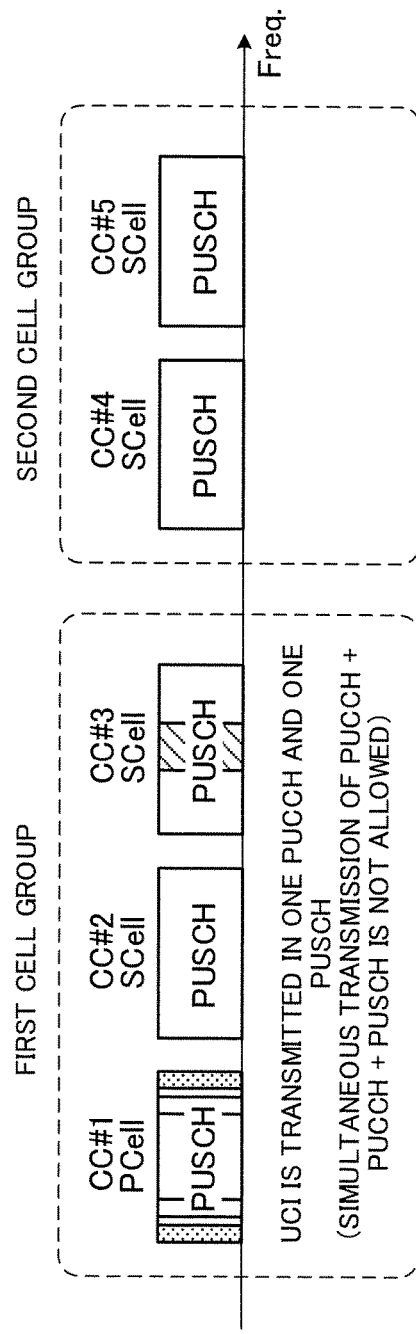

FIG. 8B assumes a case where simultaneous PUCCH-PUSCH transmission (across CCs) is configured in the first cell group, and where the number of channels into which the uplink control information of each cell group can be distributed is limited (for example, two or less). For example, if PUSCH transmission is performed in CC #1 of the first cell group, the user terminal transmits uplink control information by configuring the PUCCH for the first cell group in the PCell (CC #1). Meanwhile, the uplink control information for the second cell group is transmitted by using the PUSCH configured in CC #3.

In this way, by allocating the PUCCH for the second cell group to a predetermined CC (for example, the PCell) of the first cell group, and, meanwhile, configuring simultaneous PUCCH-PUSCH transmission across cell groups and limiting the number of channels into which uplink control information is distributed, it becomes possible to transmit UCI using separate channels between cell groups, transmit UCI according to different quality requirements, and, meanwhile, limit the maximum number of channels that carry UCI and are transmitted simultaneously, so that it is possible to prevent the case where the transmission power runs out and UCI cannot be transmitted properly.

(Structure of Radio Communication System)

Now, the structure of the radio communication system according to an embodiment of the present invention will be described below. In this radio communication system, the radio communication methods according to the embodiment of the present invention are employed. Note that the radio communication methods of the above-described embodiment may be applied individually or may be applied in combination.

Figure 9:
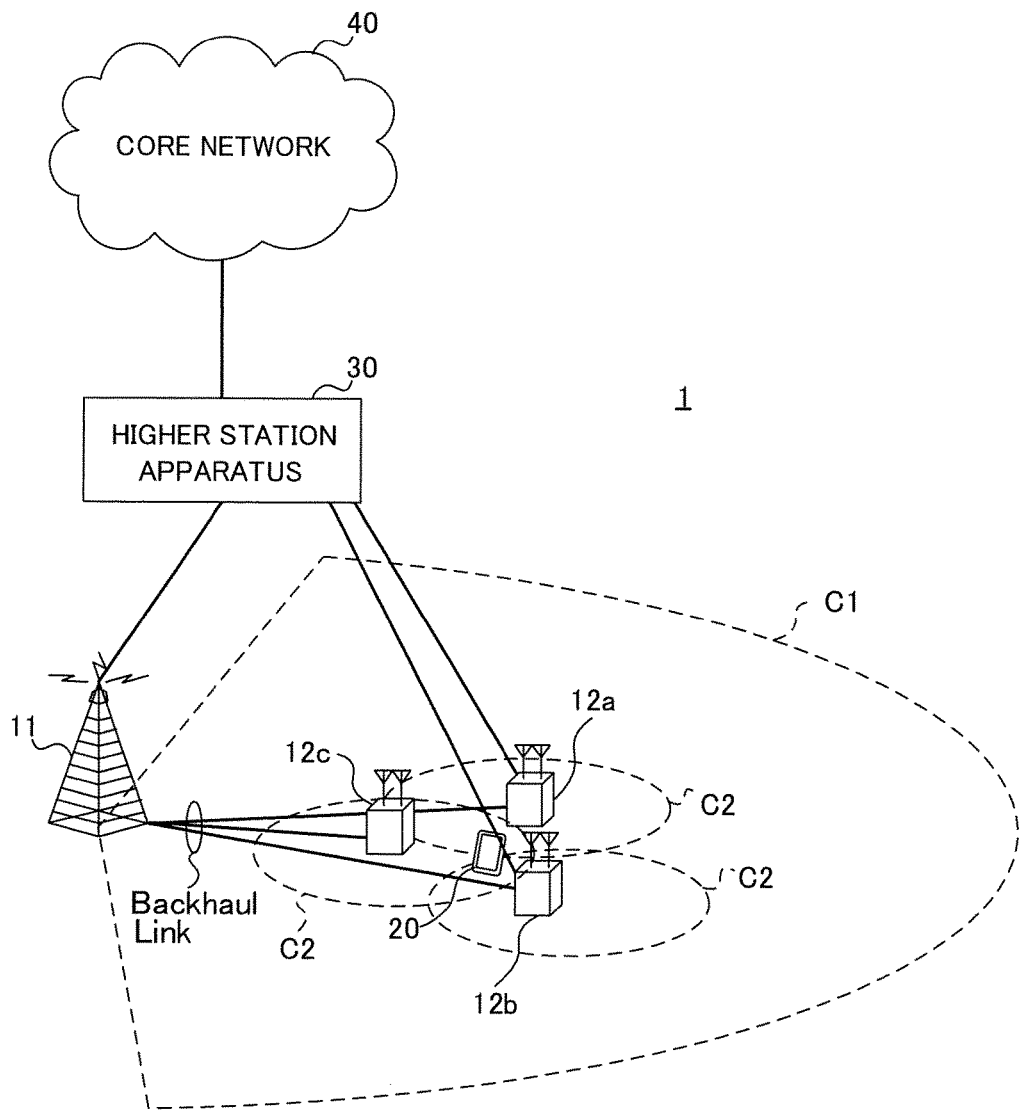
FIG. 9 is a schematic diagram to show an example of a radio communication system according to the present embodiment.

FIG. 9 is a diagram to show an example of a schematic structure of a radio communication system according to an embodiment of the present invention. Note that the radio communication system shown in FIG. 9 is a system to incorporate, for example, an LTE system, super 3G, an LTE-A system and so on. In this radio communication system, carrier aggregation (CA) and/or dual connectivity (DC) to bundle multiple component carriers (CCs) into one can be used. Note that this radio communication system may be referred to as "IMT-Advanced," or may be referred to as "4G," "5G," "FRA" (Future Radio Access) and so on.

The radio communication system 1 shown in FIG. 9 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA by using at least two CCs (cells), or use six or more CCs.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Between the radio base station 11 and the radio base stations 12 (or between two radio base stations 12), wire connection (optical fiber, the X2 interface, etc.) or wireless connection may be established.

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise. The user terminals 20 are terminals to support various communication schemes such as LTE, LTE-A and so on, and may be either mobile communication terminals or stationary communication terminals.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, the MIB (Master Information Block) and so on are communicated by the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH may be frequency-division-multiplexed with the PDSCH (downlink shared data channel) and used to communicate DCI and so on, like the PDCCH.

Also, as downlink reference signals, cell-specific reference signals (CRSs), channel state measurement reference signals (CSI-RSs: Channel State Information-Reference Signals), user-specific reference signals (DM-RSs: Demodulation Reference Signals) for use for demodulation, and other signals are included.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgment signals (HARQ-ACKs) and so on are communicated by the PUCCH. By means of the PRACH, random access preambles (RA preambles) for establishing connections with cells are communicated.

<Radio Base Station>

Figure 10:
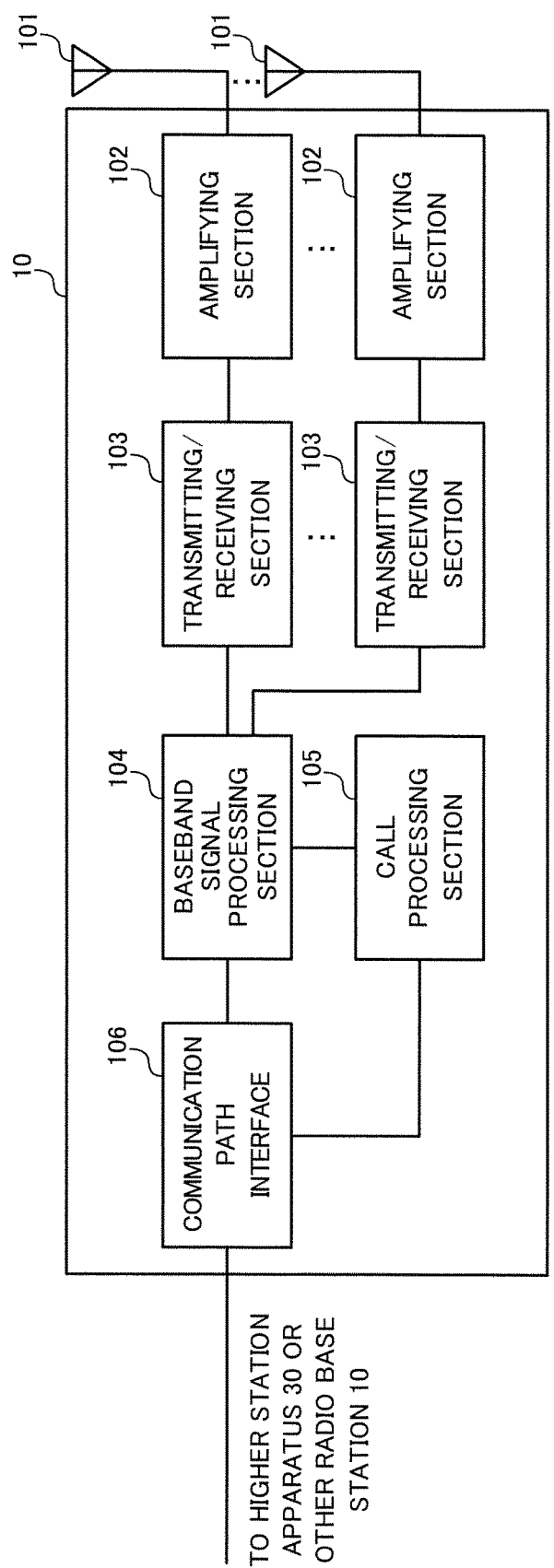
FIG. 10 is a diagram to explain an overall structure of a radio base station according to the present embodiment.

FIG. 10 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that the transmitting/receiving sections 103 are comprised of transmitting sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts baseband signals that are pre-coded and output from the baseband signal processing section 104 on a per antenna basis, into a radio frequency band. The radio frequency signals having been subjected to frequency conversion in the transmitting/receiving sections 103 are amplified in the amplifying sections 102, and transmitted from the transmitting/receiving antennas 101.

For example, the transmitting/receiving sections 103 transmit information about the CCs to be in CA, information about the cell groups to be configured, information about the configuration of simultaneous PUCCH-PUSCH transmission and so on. Note that, for the transmitting/receiving sections 103, transmitters/receivers, transmitting/receiving circuits or transmitting/receiving devices that can be described based on common understanding of the technical field to which the present invention pertains can be used.

Meanwhile, as for uplink signals, radio frequency signals that are received in the transmitting/receiving antennas 101 are each amplified in the amplifying sections 102. Each transmitting/receiving section 103 receives uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. The communication path interface 106 transmits and receive s signals to and from neighboring radio base stations 10 (backhaul signaling) via an inter-base station interface (for example, optical fiber, the X2 interface, etc.).

Figure 11:
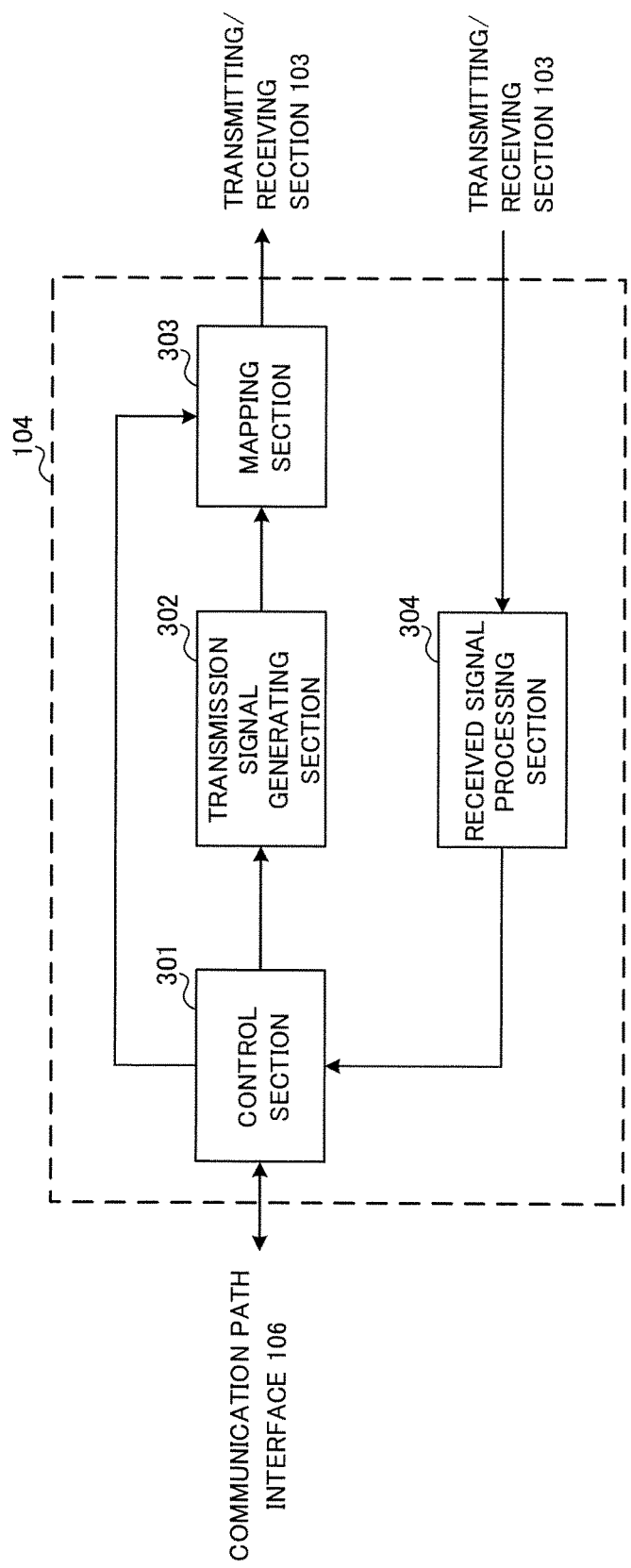
FIG. 11 is a diagram to explain a functional structure of a radio base station according to the present embodiment.

FIG. 11 is a diagram to show an example of a functional structure of a radio base station according to the present embodiment. Note that, although FIG. 11 primarily shows functional blocks that pertain to characteristic parts of the present embodiment, the radio base station 10 has other functional blocks that are necessary for radio communication as well. As shown in FIG. 11, the baseband signal processing section 104 has a control section (scheduler) 301, a transmission signal generating section (generation section) 302, a mapping section 303 and a received signal processing section 304.

The control section (scheduler) 301 controls the scheduling (for example, resource allocation) of downlink data signals that are transmitted in the PDSCH and downlink control signals that are communicated in the PDCCH and/or the EPDCCH. Furthermore, the control section (scheduler) 301 also controls the scheduling of system information, synchronization signals, paging information, CRSs, CSI-RSs and so on.

The control section 301 can control the configurations of CCs, cell groups, simultaneous PUCCH-PUSCH transmission and so on, to apply to the user terminals. Also, the control section 301 controls the scheduling of uplink reference signals, uplink data signals that are transmitted in the PUSCH, uplink control signals that are transmitted in the PUCCH and/or the PUSCH, random access preambles that are transmitted in the PRACH, and so on. Note that, for the control section 301, a controller, a control circuit or a control device that can be described based on common understanding of the technical field to which the present invention pertains can be used.

The transmission signal generating section 302 generates DL signals based on commands from the control section 301 and outputs these signals to the mapping section 303. For example, the transmission signal generating section 302 generates DL assignments, which report downlink signal allocation information, and UL grants, which report uplink signal allocation information, based on commands from the control section 301. Note that, for the transmission signal generating section 302, a signal generator, a signal generating circuit or a signal generating device that can be described based on common understanding of the technical field to which the present invention pertains can be used.

The mapping section 303 maps the downlink signals generated in the transmission signal generating section 302 to predetermined radio resources based on commands from the control section 301, and outputs these to the transmitting/receiving sections 103. Note that, for the mapping section 303, mapper, a mapping circuit or a mapping device that can be described based on common understanding of the technical field to which the present invention pertains can be used.

The received signal processing section 304 performs receiving processes (for example, demapping, demodulation, decoding and so on) of UL signals (for example, delivery acknowledgement signals (HARQ-ACKs), data signals that are transmitted in the PUSCH, and so on) transmitted from the user terminals. The processing results are output to the control section 301.

Also, by using the received signals, the received signal processing section 304 may measure the received power (for example, the RSRP (Reference Signal Received Power)), the received quality (for example, the RSRQ (Reference Signal Received Quality)), channel states and so on. Note that the measurement results in the received signal processing section 304 may be output to the control section 301. Note that a measurement section to perform the measurement operations may be provided apart from the received signal processing section 304.

The received signal processing section 304 can be constituted by a signal processor, a signal processing circuit or a signal processing device, and a measurer, a measurement circuit or a measurement device that can be described based on common understanding of the technical field to which the present invention pertains.

<User Terminal>

Figure 12:
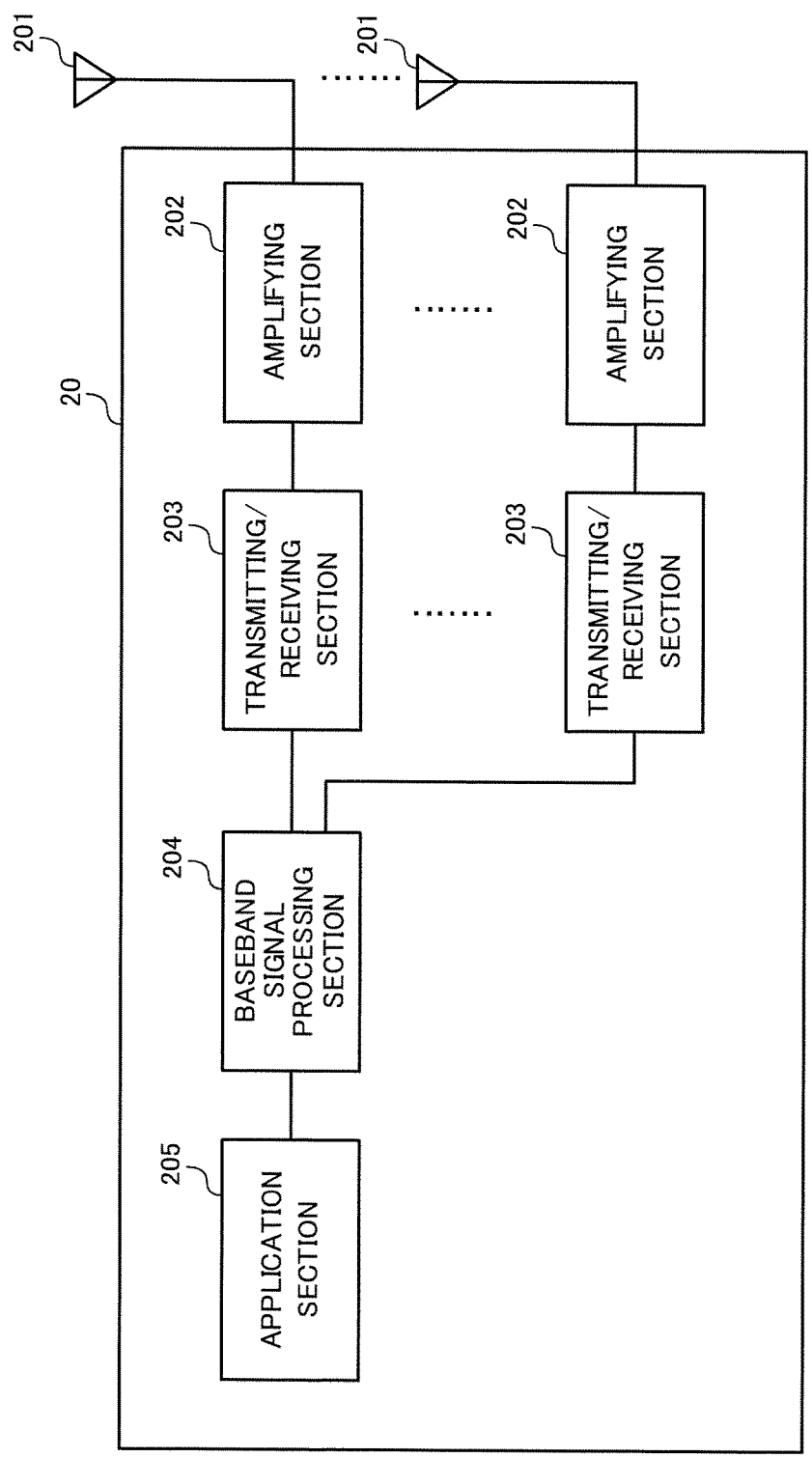
FIG. 12 is a diagram to explain an overall structure of a user terminal according to the present embodiment.

FIG. 12 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205. Note that the transmitting/receiving sections 203 may be comprised of transmitting sections and receiving sections.

Radio frequency signals that are received in a plurality of transmitting/receiving antennas 201 are each amplified in the amplifying sections 202. Each transmitting/receiving section 203 receives the downlink signals amplified in the amplifying sections 202. The received signal is subjected to frequency conversion and converted into the baseband signal in the transmitting/receiving sections 203, and output to the baseband signal processing section 204.

The transmitting/receiving sections 203 transmit uplink control information (for example, HARQ-ACKs) that is generated based on DL signals transmitted from the radio base station. Also, the transmitting/receiving sections 203 can report the user terminal's capability information (capability) to the radio base station. Further, the transmitting/receiving sections 203 can receive information about the number of CCs to be configured, information about the cell groups, information about the configuration of simultaneous PUCCH-PUSCH transmission, and so on. Note that, for the transmitting/receiving sections 203, transmitters/receivers, transmitting/receiving circuits or transmitting/receiving devices that can be described based on common understanding of the technical field to which the present invention pertains can be used.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency bandwidth in the transmitting/receiving sections 203. The radio frequency signals that are subjected to frequency conversion in the transmitting/receiving sections 203 are amplified in the amplifying sections 202, and transmitted from the transmitting/receiving antennas 201.

Figure 13:
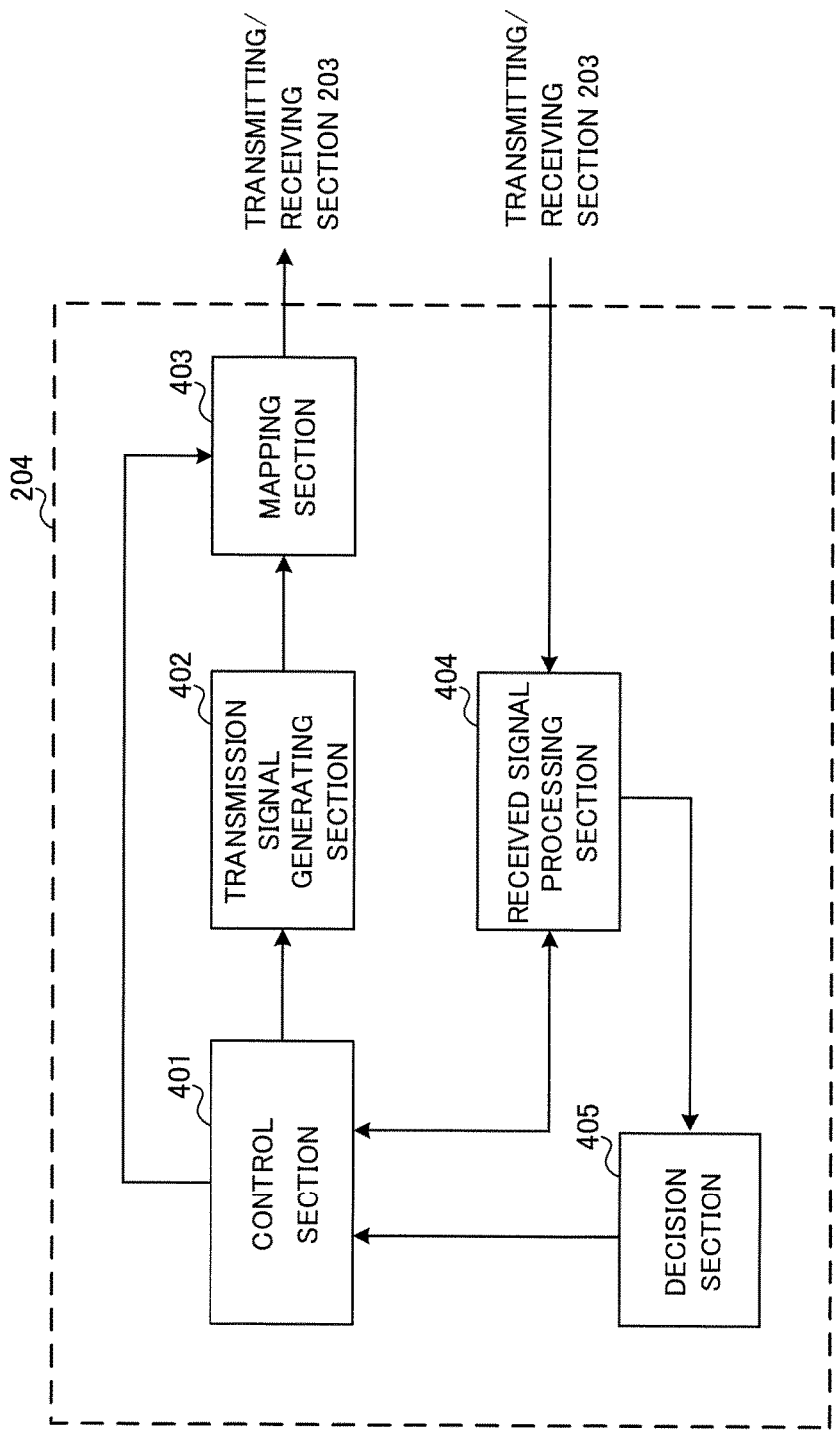
FIG. 13 is a diagram to explain a functional structure of a user terminal according to the present embodiment.

FIG. 13 is a diagram to show an example of a functional structure of a user terminal according to the present embodiment. Note that, although FIG. 13 primarily shows functional blocks that pertain to characteristic parts of the present embodiment, the user terminal 20 has other functional blocks that are necessary for radio communication as well. As shown in FIG. 13, the baseband signal processing section 204 provided in the user terminal 20 has a control section 401, a transmission signal generating section 402, a mapping section 403, a received signal processing section 404 and a decision section 405.

The control section 401 can control the transmission signal generating section 402, the mapping section 403 and the received signal processing section 404. For example, the control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation/transmission of uplink control signals (for example, HARQ-ACKs and so on) and uplink data based on downlink control information (UL grants), the result of deciding whether or not retransmission control is necessary for downlink data, and so on.

Also, the control section 401 can apply simultaneous PUCCH-PUSCH transmission for each of a plurality of cell groups, each including at least one CC, and control the transmission of uplink control information (see FIG. 4). Furthermore, the control section 401 can apply a simultaneous PUCCH-PUSCH transmission within a CC to the first cell group and apply simultaneous PUCCH-PUSCH transmission across CCs to the second cell group.

Also, the control section 401 can control the transmission of uplink control information by applying simultaneous PUCCH-PUSCH transmission across a plurality of cell groups, each including at least one component carrier (CC) (see FIG. 5). Furthermore, the control section 401 can control transmission by allocating uplink control information to a predetermined number of or fewer channels. Note that the predetermined number may be a number that is determined based on cell groups (for example, the number of cell groups), or may be a fixed value that is defined in advance (for example, 2).

Furthermore, when a PUSCH is transmitted in a given CC, the control section 401 can transmit at least a portion of the uplink control information of the first cell group by using the PUCCH of a predetermined CC, and transmit the uplink control information of a second cell group by using a PUSCH(see FIG. 5). In addition, the control section 401 can transmit the uplink control information of each cell group, separately, by using different uplink control channels of the same CC (see FIGS. 6 to 8).

For the control section 401, a controller, a control circuit or a control device that can be described based on common understanding of the technical field to which the present invention pertains can be used.

The transmission signal generating section 402 generates UL signals based on commands from the control section 401, and outputs these signals to the mapping section 403. For example, the transmission signal generating section 402 generates uplink control signals such as delivery acknowledgement signals (HARQ-ACKs) in response to DL signals, channel state information (CSI) and so on, based on commands from the control section 401.

Also, the transmission signal generating section 402 generates uplink data signals based on commands from the control section 401. For example, when a UL grant is included in a downlink control signal that is reported from the radio base station 10, the control section 401 commands the transmission signal generating section 402 to generate an uplink data signal. Also, the transmission signal generating section 402 generates UL signals from the decisions (ACKs/NACKs) made in the decision section 405. For the transmission signal generating section 402, a signal generator, a signal generating circuit or a signal generating device that can be described based on common understanding of the technical field to which the present invention pertains can be used.

The mapping section 403 maps the uplink signals (uplink control signals and/or uplink data) generated in the transmission signal generating section 402 to radio resources based on commands from the control section 401, and output the result to the transmitting/receiving sections 203. For the mapping section 403, mapper, a mapping circuit or a mapping device that can be described based on common understanding of the technical field to which the present invention pertains can be used.

The received signal processing section 404 performs the receiving processes (for example, demapping, demodulation, decoding and so on) of the DL signals (for example, downlink control signals that are transmitted from the radio base station in the PDCCH/EPDCCH, downlink data signals transmitted in the PDSCH, and so on). The received signal processing section 404 outputs the information received from the radio base station 10, to the control section 401 and the decision section 405. Note that, for the received signal processing section 404, a signal processor/measurer, a signal processing/measurement circuit or a signal processing/measurement device that can be described based on common understanding of the technical field to which the present invention pertains can be used. Also, the received signal processing section 404 can constitute the receiving section according to the present invention.

The decision section 405 makes retransmission control decisions (ACKs/NACKs) based on the decoding results in the receiving process section 404, and, furthermore, outputs the results to the control section 401. For the decision section 405, a decision maker, a decision making circuit or a decision making device that can be described based on common understanding of the technical field to which the present invention pertains can be used.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or wire and using these multiple devices.

For example, part or all of the functions of radio base stations 10 and user terminals 20 may be implemented using hardware such as an ASIC (Application-Specific Integrated Circuit), a PLD (Programmable Logic Device), an FPGA (Field Programmable Gate Array), and so on. Also, the radio base stations 10 and user terminals 20 may be implemented with a computer device that includes a processor (CPU), a communication interface for connecting with networks, a memory and a computer-readable storage medium that holds programs.

Here, the processor and the memory are connected with a bus for communicating information. Also, the computer-readable recording medium is a storage medium such as, for example, a flexible disk, an opto-magnetic disk, a ROM, an EPROM, a CD-ROM, a RAM, a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes. Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

The disclosure of Japanese Patent Application No. 2015-076142, filed on Apr. 2, 2015, including the specification, drawings and abstract, is incorporated herein by reference in its entirety.

The invention claimed is:

1. A user terminal communicating with a radio base station by using one or more component carriers (CCs), the user terminal comprising:
a processor coupled to a memory, that wherein the processor generates uplink control information corresponding to a DL signal transmitted from the radio base station,
wherein the processor controls transmission of the uplink control information,
wherein, when the user terminal is configured with a first cell group having one or more CCs including a primary cell and a second cell group having one or more CCs including a secondary cell, the processor controls the transmission of the uplink control information per cell group,
when PUCCH and PUSCH simultaneous transmission is applied to the primary cell of the first cell group and to the secondary cell of the second cell group, the uplink control information in the second cell group includes HARQ-ACK and periodic CSI, and
when PUSCH transmission is not present in the secondary cell to which the PUCCH and PUSCH simultaneous transmission is applied, the HARQ-ACK is transmitted on PUCCH of the secondary cell and the periodic CSI is transmitted on PUSCH of another secondary cell of the second cell group.

2. A radio base station communicating with a user terminal by using one or more component carriers (CCs), the radio base station comprising:
a transmitter that transmits a DL signal;
a receiver that receives uplink control information transmitted from the user terminal,
wherein, when a first cell group having one or more CCs including a primary cell and a second cell group having one or more CCs including a secondary cell are configured, the receiver receives the uplink control information per cell group,
when PUCCH and PUSCH simultaneous transmission is applied to the primary cell of the first cell group and to the secondary cell of the second cell group, the uplink control information in the second cell group includes HARQ-ACK and periodic CSI, and
when PUSCH transmission is not present in the secondary cell to which the PUCCH and PUSCH simultaneous transmission is applied, the HARQ-ACK is received on PUCCH of the secondary cell and the periodic CSI is received on PUSCH of another secondary cell of the second cell group.

3. A radio communication method for a user terminal communicating with a radio base station by using one or more component carriers (CCs), the radio communication method comprising:
generating uplink control information corresponding to a DL signal transmitted from the radio base station; and
controlling transmission of the uplink control information,
wherein, when the user terminal is configured with a first cell group having one or more CCs including a primary cell and a second cell group having one or more CCs including a secondary cell, the user terminal controls the transmission of the uplink control information per cell group,
when PUCCH and PUSCH simultaneous transmission is applied to the primary cell of the first cell group and to the secondary cell of the second cell group, the uplink control information in the second cell group includes HARQ-ACK and periodic CSI, and
when PUSCH transmission is not present in the secondary cell to which the PUCCH and PUSCH simultaneous transmission is applied, the HARQ-ACK is transmitted on PUCCH of the secondary cell and the periodic CSI is transmitted on PUSCH of another secondary cell of the second cell group.

4. The user terminal according to claim 1, wherein the uplink control information is allocated, per cell group, to a predetermined number of or fewer channels.

\* \* \* \* \*